United States Patent [19]

Coronado

[11] Patent Number: 4,535,019
[45] Date of Patent: Aug. 13, 1985

[54] LAMINATED WOOD COUPLING ARRANGEMENT

[76] Inventor: Hector M. Coronado, 2209 Via Cerritos, Palos Verdes Estates, Calif. 90274

[21] Appl. No.: 270,265

[22] Filed: Jun. 4, 1981

[51] Int. Cl.³ ............................................. B32B 5/12
[52] U.S. Cl. .................................... 428/106; 428/57; 428/114; 428/528; 428/529; 428/537.1
[58] Field of Search ................ 428/106, 57, 114, 528, 428/529, 537; 403/231, 265, 267, 403; 156/182, 304.1

[56] References Cited

U.S. PATENT DOCUMENTS 1,883,486  10/1932  Beckwith ..................... 428/537.1

Primary Examiner—Marion E. McCamish
Attorney, Agent, or Firm—Don B. Finkelstein

[57] ABSTRACT

A laminated wood coupling arrangement for fabricating unitary laminated wood joints. Two sets of multiple layers of thin wood strips placed at a 90° angle to each other overlap ends in alternating layers. Glue placed between all adjacent surfaces retains the laminate together. The bottom layer has two strips. One strip butts against the end of the side of the other strip. The second layer above also has two strips with one crossing over the butt joint of the first layer. The other strip in the second layer butts against the end of the side of the cross over strip. Additional layers may be added in this alternating arrangement to achieve any desired strength or aesthetic appearance.

11 Claims, 11 Drawing Figures

U.S. Patent Aug. 13, 1985 Sheet 1 of 3 4,535,019
FIG. 1
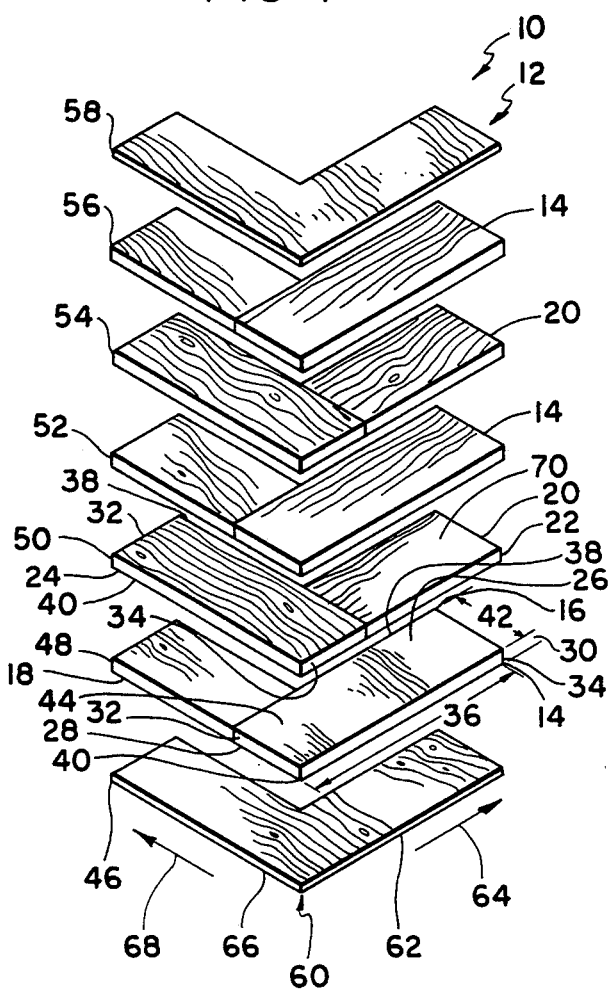
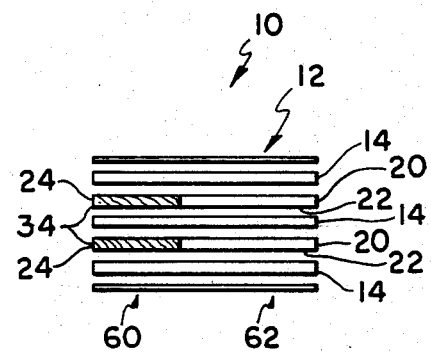
FIG. 2
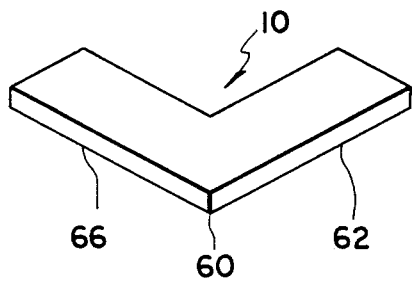
FIG. 3
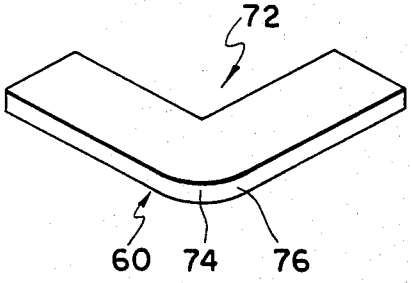
FIG. 4

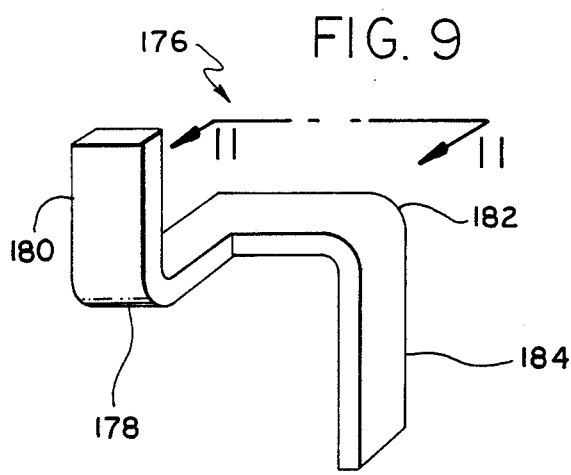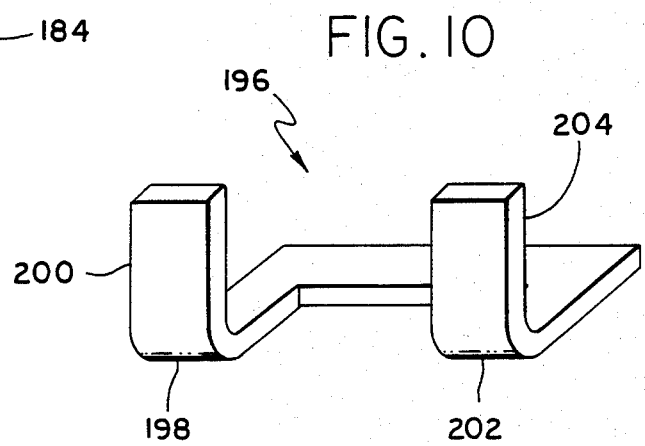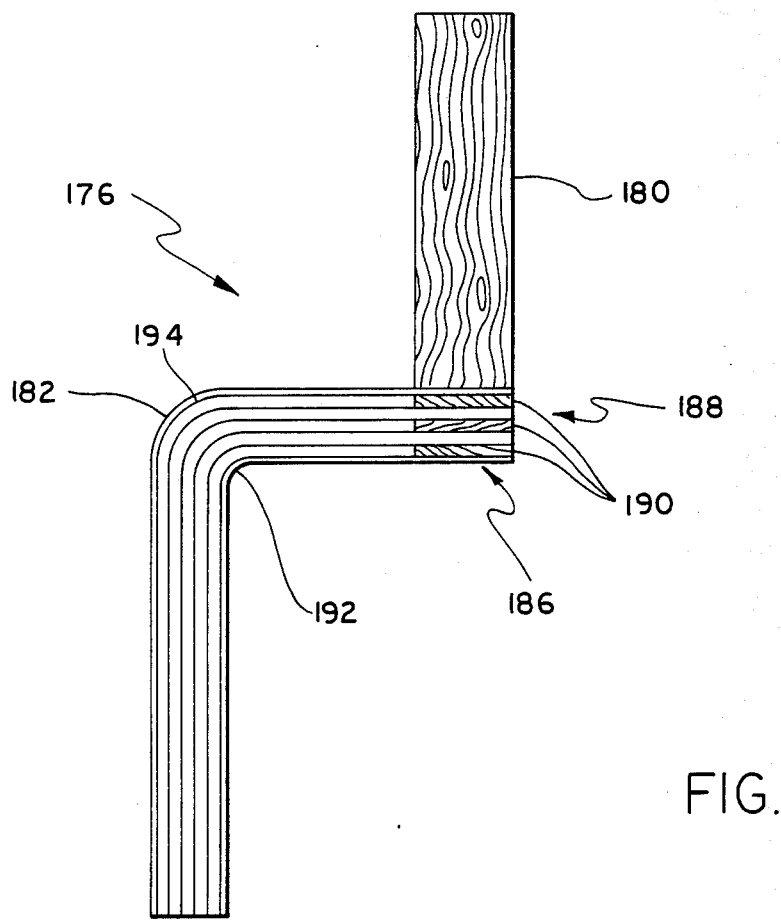

LAMINATED WOOD COUPLING ARRANGEMENT

BACKGROUND OF THE INVENTION

1. Field of the Invention

This invention relates to the carpentry art and, more particularly, to the fabrication of wood joints.

2. Description of the Prior Art

Conventional types of wood joints include butt, miter, rabbet, tongue and groove, mortise and tenon, and dado. Each type of joint has a particular use depending upon material, cost, and desired appearance. The butt, rabbet, and miter joints are inexpensive to fabricate and may be utilized with virtually any kind of wood material. However, they tend to be weak. The tongue and groove, mortise and tenon, and dado joints are more expensive and complicated to produce and require the use of solid woods. However, they are strong and stable and thus far superior to the butt, miter, and rabbet joints.

The increasing use of laminated materials has presented additional problems to carpenters because laminates tend to separate in the joints no matter what type of joint is used. The mortise and tenon, tongue and groove, and dado joints are virtually eliminated from use with laminated woods because of the tendency of the laminates to separate when the necessary angular cuts are made in the materials. The butt, miter, and rabbet joints have therefore become the standard types of joints where laminated materials are brought together. As noted above, these types of joints tend to be weak and are unsatisfactory where strong connections are required.

The increasing scarcity of solid woods has forced the use of laminated wood products. One of the major reasons for the increasing scarcity of solid woods is that higher utilization of a given log may be achieved by peeling the log into thin veneers and then forming the veneers together into stiff laminated boards instead of by cutting the log into solid wood planks. Thus, economic necessity has forced the utilization of increasing amounts of laminates and in turn created an increasing demand for a strong joint to connect two laminated pieces of wood together.

Another problem with conventional joints is that they tend to destroy the aesthetic harmony of the wood structure as a whole by their practical requirements. Only the miter joint disappears into the materials of the joint. The problem with the miter joint is that it is relatively weak and unstable. All of the other joints present unsightly lines in the finished product.

SUMMARY OF THE INVENTION

Accordingly, it is the primary object of the present invention to provide an improved laminated wood joint.

It is another object of the present invention to create a joint for laminated woods having a strength equal to that of the laminated woods themselves.

It is another object of the invention to provide a joint for laminated woods which is aesthetically pleasing.

It is another object of the invention to provide a joint for laminated woods which minimizes the separation of the laminates in the joint.

It is still another object of the present invention to provide a joint for laminated woods which is easy to fabricate.

It is another object of the invention to provide a joint for laminated woods which is inexpensive to fabricate.

These and other objects of the present invention are realized in the preferred embodiment as described in detail hereinafter.

In the preferred embodiment, the laminated wood coupling arrangement is fabricated by selecting wood strips having predetermined thicknesses and widths and then interweaving them together in a predetermined pattern in the joint area to produce a strong and attractive joint. For purposes of illustration simple wood strips having square ends are described. Complicated angular relationships between the wood strips to form joints having angles of intersection other than 90° are also possible. The joints may be carved into any desired shape such as a curve after lamination.

A minimum of four wood strips are selected each having upper, lower, front, rear, first side, and second side planar surfaces. In the preferred embodiment the front surfaces are perpendicular to the sides and upper and lower surfaces. The upper and lower planar surfaces are perpendicular to the side surfaces.

In order to fabricate the joint, the wood strips in the same layer across the joint must have the same thickness. Likewise, the wood strips in each leg on either side of the joint should have the same width unless a desired visual effect is sought.

The construction of the joint is best described by an explanation of the fabrication steps. As each strip is placed against another strip or on top of another strip, a bonding means such as glue is added to create a unitary structure which is cured by heat and pressure after the building process is completed.

Thus, if four wood strips are utilized, the resulting wood coupling arrangement has two layers of lamination. The initial fabrication step is to place the first strip down on a suitable surface. The second strip is then placed at 90° to the first strip with the front surface of the first strip aligned with the second side surface of the second strip and with the rear surface of the second strip abutting the first side surface of the first strip. A simple L configuration is created by the placement of the two wood strips. The first layer of the lamination is thereby created.

The second layer of the lamination is made by laying the sixth wood strip (the numbering of the wood strips is determined by the most complicated structure which is described below) on top of the second wood strip and over the front end of the first wood strip of the first layer so that the sixth wood strip covers the butt joint between the two wood strips in the first layer. The sixth wood strip extends to the second side surface of the first wood strip of the layer below. A fifth wood strip is then placed on top of the first wood strip and abutting the first side surface of the sixth wood strip. The second layer of the wood lamination is thereby created with the second layer superimposed on and aligned with the first layer.

Additional layers may be added to create any desired strength or aesthetic appearance. All additional layers repeat the pattern of the first two layers. For purposes of further description of the invention, all layers which are identical to the first layer are identified as the first portion of the lamination. All layers which are identical to the second layer are identified as the second portion of the lamination. Thus, as the lamination is constructed, the initial first portion is first laid down. The initial second portion is placed on next. If desired, a new first portion is placed on top of the second portion. Then if desired, an additional second portion is added on top of the new first portion. Additional first and second portions may be added in an alternating arrangement to create any desired number of layers.

A five layer arrangement has many advantages over other combinations for several reasons:

1. two intersecting wood strips from one leg are bound on the outside by two intersecting wood strips from the other leg thereby providing equal strength in the joint from each leg;

2. the central layer is surrounded on either side by an equivalent amount of material which provides an aesthetic balance;

3. a minimum number of separate layers is utilized to achieve the desired strength characteristics and aesthetic balance in comparison to 7, 9, or 11 layer combinations; and 4. the central layer may be provided with a colored edge to create an attractive aesthetic appearance or, alternatively, the paired second and fourth or first and fifth layers may be colored to create this desired balanced appearance.

If desired, an additional finish layer may be placed on the outside with the grain all running in the same direction. The two legs are thus made to appear to be cut from one piece of wood. This finish layer may be an extremely thin veneer of natural wood or it may be plastic. A similar thin finish layer may be placed on the opposite side with the grain running in the same direction to create a similar appearance.

To this point, the preferred embodiment of the present invention has been described as a simple L structure. Instead of an L structure, the wood strips may be assembled into a V structure having any desired angular relationship between the two legs of the V.

An additional third leg may be added to one of the legs of the L to create a wood form in the shape of the letter U. The addition of a fourth leg connecting the first and third legs creates a structure having the shape of a square letter O. Any other combination is also possible requiring the connection of two or more pieces of wood.

Bending of the laminates as they are constructed makes possible the creation of three dimensional structures. It would be possible, for example, to construct the entire frame for a chair from a unitarily laminated wood composition combining the present state of the art bending techniques and the unique wood coupling arrangement of the present invention.

BRIEF DESCRIPTION OF THE DRAWINGS

FIG. 1 is an exploded view of the assembly of wood strips in accordance with the present invention.

FIG. 2 is a side elevational view perpendicular to the rignt side of FIG. 1.

FIG. 3 is a perspective view of the assembled embodiment illustrated in FIGS. 1 and 2.

FIG. 4 is a perspective view of another embodiment of the present invention.

FIG. 9 is a perspective view of another embodiment of the present invention.

FIG. 10 is a perspective view of another embodiment of the present invention.

FIG. 11 is an enlarged side elevational view of the embodiment shown in FIG. 9 in the direction of arrows 11.

DESCRIPTION OF THE PREFERRED EMBODIMENT

Figure 5:
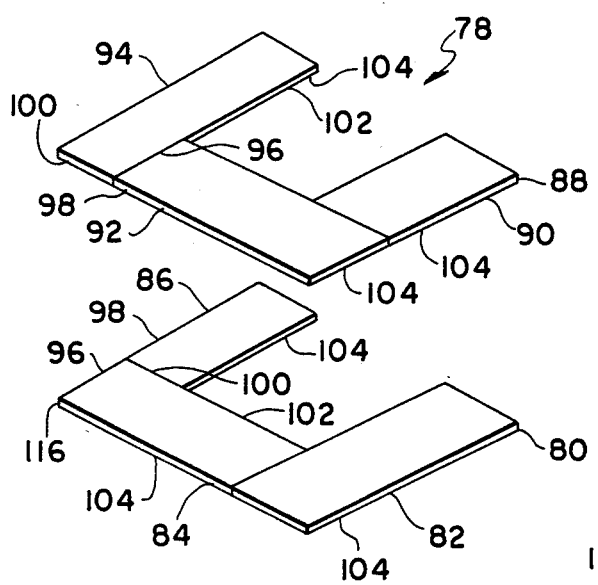
FIG. 5 is an exploded view of another embodiment of the present invention.

Referring now to the various figures of the drawing, there is illustrated in FIGS. 1, 2, and 3 a preferred embodiment of a laminated wood coupling arrangement generally designated 10 of the present invention showing an assembly of a plurality of layers 12. FIG. 1 shows an exploded view of arrangement 10. First portion 14 of said plurality of layers 12 has first wood strip 16 and second wood strip 18. Second portion 20 has fifth wood strip 22 and sixth wood strip 24 (the numbering of the wood strips is determined by the most complicated structure shown in FIG. 7 below). As shown in FIGS. 1 and 2, first portion 14 is repeated three times in arrangement 10. Second portion 20 is repeated two times in arrangement 10. Each first portion 14 is identical to every other first portion 14 and every second portion 20 is identical to every other second portion 20. While a total of five first and second portions 14 and 20 are illustrated in FIGS. 1 and 2, at least one of each is required to have the laminated wood coupling arrangement 10 and any number could be added depending upon the desired strength requirement and aesthetic appearance. If there are only two layers, either portion may be above or below the other.

Each of the wood strips 16, 18, 22, and 24 have an upper planar surface 26, a lower planar surface 28 spaced a transverse distance from and parallel to upper planar surface 26 with the transverse distance defining the thickness 30 of the given wood strip. All of the upper planar surfaces shown on all of the wood strips in FIGS. 1 through 3 of the drawing are upper planar surface 30 as designated only on first wood strip 16. Likewise, all lower planar surfaces of all the wood strips in FIGS. 1 through 3 are lower planar surfaces 28 as is designated only on first wood strip 16. Thus, while each upper and lower planar surface throughout all of the figures could have been designated with the appropriate number, only first wood strip 16 is actually marked with a numerical designation in order to avoid confusion and unnecessary clutter in the figures.

Front surface 32 is longitudinally spaced from rear surface 34 with the longitudinal distance defining the length 36 of any given wood strip. As noted in the immediately preceeding paragraph, for purposes of clarity only first wood strip 16 has been marked with the numerical designations of front surface 32, rear surface 34, and length 36. All other wood strips in FIGS. 1 through 3 could have been marked. Rear surface 34 is always encountered first when the figure is viewed in a clockwise direction. Front surface 32 is the ending surface as the eye travels along any given wood strip in the clockwise direction through the figure. Thus, using sixth wood strip 24 as an example, rear surface 34 is first encountered when the eye moves in a clockwise direction from fifth wood strip 22 onto sixth wood strip 24. As the eye moves along sixth wood strip 24, it leaves at front surface 32.

First side surface 38 is spaced a lateral distance from second side surface 40 with the lateral distance defining the width 42 of any given wood strip. Again, for purposes of clarity all of the wood strips illustrated in FIGS. 1 through 3 are not given designations for first and second side surfaces. Only first wood strip 16 is marked. For any given wood strip, when the eye moves in a clockwise direction, the first side surface 38 is always toward the inside of the circle. The second side surface 40 is always toward the outside of the circle. Thus, again using sixth wood strip 24 as a sample, second side surface 40 is on the outside and first side surface 38 is on the inside as the eye moves in a clockwise direction.

Wood fibers 44 creating the grain of the wood in any given wood strip run substantially along the length 36 from the front surface 32 to the rear surface 34. Again, only first wood strip 16 is marked with the designation for wood fibers 44. However, the direction of the wood fibers 44 is clearly illustrated on all the other wood strips.

Arrangement 10 has 7 layers: the first finish layer 46, first layer 48, second layer 50, third layer 52, fourth layer 54, fifth layer 56, and second finish layer 58. First, third, and fifth layers 48, 52, and 56 are all first portions 14 with identical wood strip arrangements. Second and fourth layers 50 and 54 are all second portions 20 with the alternative wood strip arrangement. Thickness 30 of the two wood strips in any given layer must be identical in order for the next layer to lie flat on top of the previously layer. Thus, first and second wood strips 16 and 18 in the first layer 48 must have the same thickness. Likewise, fifth and sixth wood strips 22 and 24 in second layer 50 must have the same thickness. However, the thickness of the wood strips in first layer 48 need not be the same as the thickness of the wood strips in second layer 50.

The width 42 of first wood strip 16 need not be the same as the width of fifth wood strip 22 immediately above it. Nor does width 42 of first wood strip 16 have to be the same as the width of second wood strip 18. The width of any given wood strip is determined merely by strength and aesthetic consideration. If a smooth outer appearance is desired, identical widths of all of the wood strips is selected. If indentation on one or more layers of the plurality of layers 12 is desired, a narrower width can be selected for one or more of the wood strips.

The actual interlocking of all the wood strips in the laminated wood coupling arrangement 10 is achieved by the intricate relationship between the first wood strip 16 and second wood strip 18 in first portion 14, fifth wood strip 22 and sixth wood strip 24 in second portion 20, and the alternating relationship between first portion 14 and second portion 20. Additional first portions 14 and second portions 20 have additional wood strips arranged in the same intricate manner as the original first portion 14 and second portion 20 and the first and second portions 14 and 20 alternate with each other.

Thus, in first portion 14 the front surface 32 of first strip 16 is aligned with second side surface 40 of second wood strip 18. Rear surface 34 of second wood strip 18 abuts first side surface 38 of first wood strip 16. In addition, lower surfaces 28 of first and second strips 16 and 18 are substantially coplanar. Since first wood strip 16 and second wood strip 18 have the same thickness 30, the upper planar surfaces 26 are also substantially coplanar.

In second portion 20, front surface 32 of fifth wood strip 22 abuts first side surface 38 of sixth wood strip 24. Rear surface 34 of sixth wood strip 24 is aligned with second side surface 40 of fifth wood strip 22. Lower surfaces 28 of fifth and sixth wood strips 22 and 24 are substantially coplanar. Since fifth and sixth wood strips 22 and 24 have the same thickness 30, upper planar surfaces 26 of fifth and sixth wood strips 22 and 24 are substantially coplanar.

In the superimposed vertical relationship between first and second portions 14 and 20, rear surface 34 of sixth wood strip 24 is aligned vertically with second side surface 40 of first wood strip 16. Front surface 32 of first wood strip 16 is aligned with second side surface 40 of sixth wood strip 24.

Second portion 20 is superimposed on and in aligned relationship with first portion 14. As noted above, depending upon the relative width 42 of the given wood strips and the desire to have precise vertical alignment, the first side surfaces 38 and second side surfaces 40 of the given wood strips in the various layers may or may not be in precise vertical alignment. As illustrated in FIGS. 1 through 3, the first and second side surfaces 38 and 40 of the given wood strips are in precise vertical alignment. However, they need not be in precise vertical alignment in order for the laminated wood coupling arrangement 10 to be effective as long as the plurality of layers 12 are substantially superimposed and substantially aligned with each other.

In order for the arrangement 10 to obtain maximum strength, first portion 14 and second portion 20 are in the alternating relationship described above. Obviously, if there are only two layers, first portion 14 and second portion 20 must be alternating because there are only one of each. As additional first and second portions 14 and 20 are added, it would be possible to stack any number of first portions 14 or second portions 20 together. However, such an arrangement would have no greater strength than two boards with their ends glued together. The strength inherent in the present invention lies in the alternating relationship between first portions 14 and second portions 20.

It should be noted that no difference in strength exists between having the second portion 20 on top of the first portion 14 or the first portion 14 on top of the second portion 20.

As completed, arrangement 10 has a first joint 60 wherein end portions adjacent rear surface 34 of sixth wood strip 24 are in superimposed relationship to end portions adjacent front surface 32 of first wood strip 16. A first leg 62 extends in a first direction indicated by arrow 64 away from first joint 60. A second leg 66 extends in a second direction indicated by arrow 68 different from the first direction away from first joint 60.

If desired, first and second finish layers 46 and 58 may be placed on the top or the bottom of arrangement 10 to produce a uniform surface texture such as the appearance of wood grain running substantially the same direction on both legs. An extremely thin layer of veneer may be utilized for this purpose. Alternatively, artificial plastic veneers may be utilized for both decorative and protective purposes. While two finished layers are shown in FIG. 1, only one finish layer such as second finish layer 58 may be needed where only one side of arrangement 10 is visible.

Throughout the fabrication process, a glue or bonding means 70 is placed on the wood strips as they are assembled at the locations where they touch other woods strips. Once the arrangement 10 is assembled, heat and pressure are applied to laminate the plurality of layers 12 into a single unitary mass. The preferred heat and pressure laminating technique utilizes a radio frequency generator to create the required heat and wooden molds to hold arrangement 10 during the curing process. Depending upon the overall thickness of arrangement 10, only 30 seconds to 2½ minutes are required at a frequency of 13.5 megacycles to complete the laminating process. The preferred type glue is a combination of CR-5h resin and F-132 catalyst manufactured by Borden Chemical Division of Borden, Inc.

Alternatively, the laminated wood coupling arrangement 10 may be cured in a standard heat oven. However, additional time is required to penetrate to the center of arrangement 10 and cooling jigs must be utilized for cooling for several hours to prevent warping.

FIG. 2 is a side elevational view perpendicular to the right side of FIG. 1. The spacing between the various elements of FIG. 1 has been diminished somewhat in order to compress the height of the drawing. The uniform direction of the wood grain in first portions 14 is clearly illustrated. The identical wood grain direction is also illustrated in fifth wood strip 22 of second portion 20. However, as soon as sixth wood strips 24 are reached moving from right to left, rear surfaces 34 of sixth wood strips 24 appear and the direction of the wood grain turns perpendicular into the page. Joint 60 occurs where the alternating wood grain is shown between first portions 14 and second portions 20. First leg 62 is the portion of FIG. 2 where the wood grain is all in the same direction parallel to the surface of the drawing.

FIG. 3 is perspective view of arrangement 10 illustrated in FIGS. 1 and 2 after it has been compressed together and laminated into a single unit. The result is a unitary L shaped structural element having first joint 60, first leg 62, and second leg 66.

The arrangement 10 illustrated in FIGS. 1, 2, and 3 is unadorned by extra coloration material such as paint. The simple wood grain of the wood comprising each wood strip is the only decoration. Thus, along first leg 62 the grain of the wood all runs in the same direction of arrow 64. Likewise, along second leg 66 the g side elevational view perpendicular to the right side of FIG. 1. The spacing between the various elements of FIG. 1 has been diminished somewhat in order to compress the height of the drawing. The uniform direction of the wood grayers of wood have grains perpendicular to each other throughout. The appearance of the grain of the wood along the edge of laminated wood coupling arrangement 10 is, therefore, vastly superior to the edge presented by a piece of ordinary plywood.

If desired, one or more of the plurality of layers 12 may be stained or painted prior to assembly. For example, an attractive design may be created by providing third layer 52 with edge coloration. The mass of natural wood on either side of third layer 52 may be made equal and symetrical by having all of the layers equal in width to the width of the third layer. Another possibility is to leave third layer 52 clear so that the natural wood grain shows through and then color second and fourth layers 50 and 54 prior to assembly. Again, a harmonious and aesthetic geometric appearance is created. The advantage of coloring one layer of the laminated wood coupling arrangement 10 prior to assembly is readily apparent. No smearing of coloration on adjacent layers is possible because there are no adjacent layers at the time of coloration. A fine color line results between natural wood layers in the final product.

Alternatively, a layer such as third layer 52 may be made with wood strips having a width less than the width of the wood strips in second layer 50 and fourth layer 54. As arrangement 10 is assembled, the second side surface 40 of first wood strip 16 of the third layer 52 can be indented in comparison to the second side surfaces 40 of the wood strips in adjacent layers. A fine groove along first leg 60 results when arrangement 10 is laminated together.

FIG. 4 is a perspective view of another embodiment 72 of the present invention. Embodiment 72 is identical to arrangement 10 of FIGS. 1, 2, and 3 except that curve 74 has be routed or cut along the forward face 76 of first joint 60. After arrangement 10 has been laminated, it is a single unitary piece and it can be cut, sanded, drilled, or otherwise worked as a normal piece of wood. Those skilled in the art will recognize numerous possibilities for creating different shapes in addition to the simple curve 74 illustrated in FIG. 4.

Figure 6:
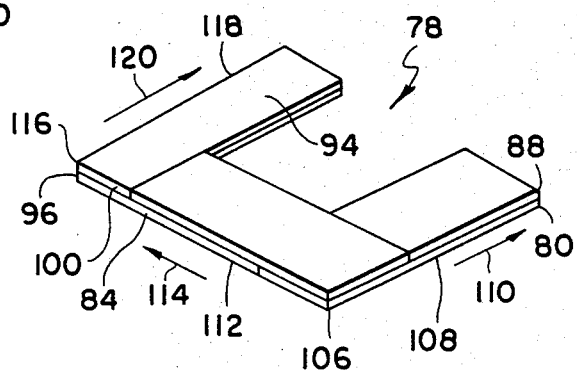
FIG. 6 is a perspective view of the embodiment shown in FIG. 5.

FIGS. 5 and 6 illustrate another embodiment 78 of the present invention. FIG. 5 is an exploded view of embodiment 78. First portion 80 is similar to first portion 14 shown in FIGS. 1 and 2. First portion 80 has a first wood strip 82, a second wood strip 84, and a third wood strip 86. First wood strip 82 is identical to first wood strip 16 illustrated in FIGS. 1 and 2. Second wood strip 84 is similar to second wood strip 18 of arrangement 10. First wood strip 82 and second wood strip 84 are assembled in exactly the same manner as described in conjunction with the description of the assembly of first wood strip 16 and second wood strip 18 into first portion 14 of arrangement 10. The only new element is third wood strip 86.

Second portion 88 is similar to second portion 20 of arrangement 10. Second portion 88 of embodiment 78 has a fifth wood strip 90, a sixth wood strip 92, and a seventh wood strip 94. Fifth wood strip 90 is identical to fifth wood strip 22 of arrangement 10. Sixth wood strip 92 is similar to sixth wood strip 24 of arrangement 10. Fifth and sixth wood strips 90 and 92 are assembled in exactly the same manner as fifth and sixth wood strips 22 and 24 of arrangement 10. The only new element is the addition of seventh wood strip 94.

Third wood strip 86 has the same thickness as first and second wood strips 82 and 84. Seventh wood strip 94 has the same thickness as fifth and sixth wood strips 90 and 92.

Front surface 96 of second strip 84 is aligned with second side surface 98 of third strip 86. Rear surface 100 of third strip 86 abuts first side surface 102 of second strip 84. Lower surfaces 104 of first, second, and third strips 82, 84, and 86 are substantially coplanar.

Front surface 96 of sixth strip 92 abuts first side surface 102 of seventh strip 94. Rear surface 100 of seventh strip 94 is aligned with second side surface 98 of sixth strip 92. Lower surfaces 104 of fifth, sixth, and seventh strips 90, 92, and 94 are substantially coplanar.

FIG. 6 illustrates first portion 80 and second portion 88 bonded together. First joint 106 is identical to first joint 60 of arrangement 10 illustrated in FIG. 3. First leg 108 is identical to first leg 62 of arrangement 10 and extends in a first direction indicated by arrow 110. Second leg 112 is similar to second leg 66 of embodiment 10 and extends in a second direction indicated by arrow 114 different from the first direction indicated by arrow 110. A second joint 116 is created by the interrelationship of first portion 80 and second portion 88. A third leg 118 extends from second joint 116 in a third direction indicated by arrow 120 different from the second direction indicated by arrow 114. Second joint 116 is formed where end portions adjacent rear surface 100 of seventh wood strip 94 are superimposed on end portions adjacent front surface 96 of second wood strip 84.

Figure 7:
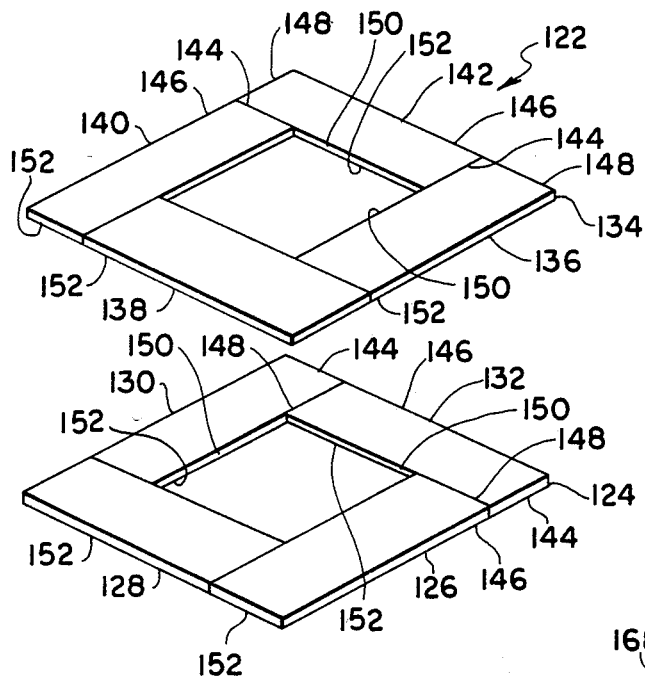
FIG. 7 is an exploded view of another embodiment of the present invention.
Figure 8:
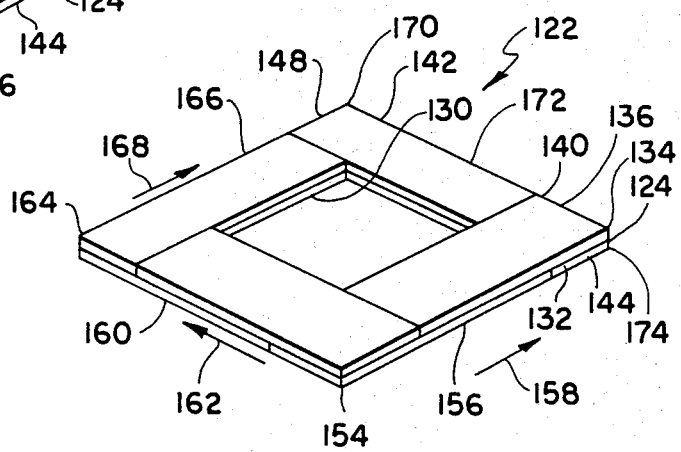
FIG. 8 is a perspective view of the embodiment shown in FIG. 7.

FIGS. 7 and 8 illustrate another embodiment 122 of the present invention. FIG. 7 is an exploded view of embodiment 122. First portion 124 is similar to first portion 80 of embodiment 78 shown in FIGS. 5 and 6 and first portion 14 of arrangement 10 shown in FIGS. 1, 2, and 3. First portion 124 has first wood strip 126, second wood strip 128, third wood strip 130, and fourth wood strip 132. First and second wood strip 126 and 128 are identical to first and second wood strips 82 and 84 of embodiment 78. First wood strip 126 and second wood strip 128 are assembled in exactly the same manner as described in conjunction with the description of the assembly of first wood strip 16 and second wood strip 18 in first portion 14 of arrangement 10.

Third wood strip 130 is similar to third wood strip 86 of embodiment 78. Third wood strip 130 is assembled to second wood strip 128 in exactly the same manner as described in conjunction with the description of the assembly of second wood strip 84 to third wood strip 86 of embodiment 78. The new addition to the first portion 124 of embodiment 122 is fourth wood strip 132 which completes the square.

Second portion 134 is similar to second portion 88 of embodiment 78 shown in FIGS. 5 and 6 and second portion 20 shown in FIGS. 1, 2, and 3. Second portion 134 has fifth wood strip 136, sixth wood strip 138, seventh wood strip 140, and eighth wood strip 142. Fifth wood strip 136 is similar to fifth wood strip 90 of embodiment 78. Sixth and seventh wood strips 138 and 140 are identical to sixth and seventh wood strips 92 and 94 of embodiment 78. The new element of second portion 134 is eighth wood strip 142.

Fifth and sixth wood strips 136 and 138 are assembled in exactly the same manner as fifth and sixth wood strips 90 and 92 of embodiment 78 and fifth and sixth woods strips 22 and 24 of arrangement 10. Seventh wood strip 140 is assembled to sixth wood strip 138 in exactly the same manner as seventh wood strip 94 is assembled to sixth wood strip 92 in embodiment 78.

Fourth wood strip 132 has the same thickness as first, second, and third wood strips 126, 128, and 130. Eighth wood strip 142 has the same thickness as fifth, sixth, and seventh wood strips 136, 138, and 140.

Front surface 144 of third strip 130 is aligned with second side surface 146 of fourth strip 132. Rear surface 148 of fourth strip 132 abuts first side surface 150 of third strip 130. In addition, front surface 144 of fourth strip 124 is aligned with second side surfaces 146 of first strip 126. Rear surface 148 of first strip 126 abuts first side surface 150 of fourth strip 132. Lower surfaces 152 of first, second, third, and fourth wood strips 126, 128, 130, and 132 are substantially coplanar.

Front surface 144 of seventh strip 140 abuts first side surface 150 of eighth strip 142. Rear surface 148 of eighth strip 142 is aligned with second side surface 146 of seventh strip 140. In addition, front surface 144 of eighth strip 142 abuts first side surface 150 of fifth strip 136. Rear surface 148 of fifth strip 136 is aligned with second side surface 146 of eighth strip 142. Lower surfaces 152 of fifth, sixth, seventh, and eighth wood strips 136, 138, 140, and 142 are substantially coplanar.

FIG. 8 illustrates first portion 124 and second portion 134 bonded together. First joint 154 is identical to first joint 106 of embodiment 78 illustrated in FIG. 6 and first joint 60 of arrangement 10 illustrated in FIG. 3. First leg 156 is similar to first leg 108 of arrangement 78 and first leg 62 of arrangement 10 and extends in a first direction indicated by arrow 158. Second leg 160 is identical to second leg 112 of embodiment 78 and is similar to second leg 66 of embodiment 10. Second leg 160 extends in a second direction indicated by arrow 162 different from the first direction indicated by arrow 158. Second joint 164 is identical to second joint 116 of embodiment 78. Third leg 166 is similar to third leg 118 of embodiment 78 and extends from second joint 164 in a third direction indicated by arrow 168 different from the second direction indicated by arrow 162.

A third joint 170 and a fourth joint 174 are created by the interrelationship of first portion 124 and second portion 134. A fourth leg 172 extends from third joint 170 to fourth joint 174.

Third joint 170 is formed where end portions adjacent rear surface 148 of eighth wood strip 142 are superimposed on end portions adjacent front surface 144 of third wood strip 130. Fourth joint 174 is formed where end portions adjacent rear surface 140 of fifth wood strip 136 are superimposed on end portions adjacent front surface 144 of fourth wood strip 132.

FIGS. 9 and 11 are illustrations of another embodiment 176 of the present invention. FIG. 9 is a perspective view of embodiment 176. Embodiment 176 is identical to arrangement 10 shown in FIG. 3 with the addition of first curve 178 in first leg 180 and second curve 182 in second leg 184. The results is a complicated three dimentional stuctural element.

FIG. 11 is an enlarged side elevational view of embodiment 176 of FIG. 9 in the direction of arrows 11. First joint 186 is fabricated in exactly the same manner as first joint 60 of arrangement 10 shown in FIGS. 1 and 2. Exactly the same number of plurality of layers 188 are shown as are shown in the plurality of layers 12 of arrangement 10. However, the front surfaces 190 of first leg 180 are shown instead of front surfaces 32 of second leg 66 of arrangement 10.

FIG. 11 at second curve 182 clearly shows the nature of a laminated wood arrangement at a curve. The first layer 192 toward the center of the curve has a much shorter radius than does fifth layer 194 at the outside of the curve. The intermediate layers have intermediate radii. The result is an extremely strong curve in comparison to a bent curve in a solid piece of wood. Any curve requires the compression of wood fibers toward the center of the curve and the stretching of the wood fibers toward the outside of the curve. The wood fibers in the various layers of embodiment 176 are compressed and stretched only minimally in comparison to the wood fibers in a similar piece of solid wood with the same thickness. Also solid wood can only be bent up to certain limited radii depending upon the thickness and type of wood. Laminated wood curves, on the other hand, can be made with virtually any radius and thickness.

The combination of the curve fabricating technique illustrated in second curve 182 and the laminated wood coupling arrangement of the present invention as shown in first joint 186 results in a method for making attractive, versatile, and extremely strong wood laminated structures.

FIG. 10 is a perspective view of another embodiment 196 of the present invention. Embodiment 196 is identical to embodiment 78 shown in FIG. 6 with the addition of first curve 198 in first leg 200 and second curve 202 in third leg 204. First and second curves 198 and 202 are formed in the same manner as second curve 182 of embodiment 176 shown in FIG. 11. The result is another complicated three dimentional structural element which might possibly be utilized for a portion of a chair frame.

Those skilled in the art will realize that a wide variety of embodiments may be employed in producing structures in accordance with the present invention. In many instances, such embodiments may not even resemble those depicted here and may be used for applications other than those shown and described. Nevertheless, such embodiments will employ the spirit and scope of the invention as set forth in the following claims.

I claim:

1. A laminated wood coupling arrangement, comprising in combination:
    a plurality of layers;
    a first portion of said plurality of layers having at least a first wood strip and a second wood strip;
    a second portion of said plurality of layers having at least a fifth wood strip and a sixth wood strip;
    each of said wood strips in each of said first portion and second portion of said plurality of layers having:
        an upper planar surface;
        a lower planar surface spaced a transverse distance from and parallel to said upper planar surface and said transverse distance defining the thickness of said wood strip;
        a front surface;
        a rear surface spaced longitudinally from said front surface and said longitudinal spacing defining the length of said wood strip;
        a first side surface;
        a second side surface spaced a lateral distance from said first side surface and said lateral distance defining the width of said wood strip; and
        wood fibers creating the grain of the wood running substantially along said longitudinal length from said front surface to said rear surface;
    said first wood strip having the same thickness as said second wood strip;
    said fifth wood strip having the same thickness as said sixth wood strip;
    said front surface of said first strip aligned with said second side surface of said second strip, said rear surface of said second strip abutting said first side surface of said first strip, and said lower surfaces of said first and second strips substantially coplanar;
    said front surface of said fifth strip abutting said first side surface of said sixth strip, said rear surface of said sixth strip aligned with said second side surface of said fifth strip, and said lower surfaces of said fifth and sixth strips substantially coplanar;
    said rear surface of said sixth strip substantially aligned vertically with said second side surface of said first strip;
    said front surface of said first strip substantially aligned vertically with said second side surface of said sixth strip;
    said first and second portions in superimposed relationship having one of said second portion of said plurality of layers coupled in superimposed relationship to and in aligned relationship with said first portion of said plurality of layers, and said first portion of said plurality of layers coupled in superimposed relationship to and in aligned relationship with said second portion of said plurality of layers; and
    said first portion and said second portion in alternating relationship.

2. The arrangement defined in claim 1 and further comprising:
    bonding means for coupling said plurality of layers together;
    said bonded together layers having:
        at least a first joint wherein end portions adjacent said rear surface of said sixth wood strip of said second portion are in vertical relationship to end portions adjacent said front surfaces of said first wood strip of said first portion; and,
        a first leg extending in a first direction from said first joint and a second leg extending in a second direction different from said first direction from said first joint.

3. The arrangement defined in claim 2 wherein said plurality of layers includes a combined total of three layers.

4. The arrangement defined in claim 2 wherein said plurality of layers includes a combined total of five layers.

5. The arrangement defined in claim 2 and further comprising a first finish layer having the appearance of a wood grain running substantially in the same direction on each of said first and second legs and superimposed on and aligned with said plurality of layers as the first outermost layer thereon.

6. The arrangement defined in claim 5 and further comprising a second finish layer having the appearance of a wood grain running substantially in the same direction on each of said first and second legs and transversely spaced from said first finish layer as a second outermost layer.

7. The arrangement defined in claim 2, and further comprising:
    said first portion having a third wood strip;
    said second portion having a seventh wood strip:
    each of said third and seventh wood strips having:
        an upper planar surface;
        a lower planar surface spaced a transverse distance from and parallel to said upper planar surface and said transverse distance defining the thickness of said wood strip;
        a front surface;
        a rear surface spaced longitudinally from said front surface and said longitudinal spacing defining the length of said wood strip;
        a first side surface;
        a second side surface spaced a lateral distance from said first side surface and said lateral distance defining the width of said wood strip; and
        wood fibers creating the grain of the wood running substantially along said longitudinal length from said front surface to said rear surface;
    said third wood strip having the same thickness as said first and second wood strips;
    said seventh wood strip having the same thickness as said fifth and sixth wood strips;

said front surface of said second strip aligned with said second side surface of said third strip, said rear surface of said third strip abutting said first side surface of said second strip, and said lower surfaces of said first, second, and third strips substantially coplanar;

said front surface of said sixth strip abutting said first side surface of said seventh strip, said rear surface of said seventh strip aligned with said second side surface of said sixth strip, and said lower surfaces of said fifth, sixth, and seventh strips substantially coplanar;

said bonded together layers having:
- a second joint wherein end portions adjacent said rear surface of said seventh wood strip are in vertical relationship to end portions adjacent said front surface of said second wood strip; and
- a third leg extending from said second joint in a third direction different from said second direction.

8. The arrangement defined in claim 7, and further comprising:

said first portion having a fourth wood strip;

said second portion having an eighth wood strip;

each of said fourth and eighth wood strips having:
- an upper planar surface;
- a lower planar surface spaced a transverse distance from and parallel to said upper planar surface and said transverse distance defining the thickness of said wood strip;
- a front surface;
- a rear surface spaced longitudinally from said front surface and said longitudinal spacing defining the length of said wood strip;
- a first side surface;
- a second side surface spaced a lateral distance from said first side surface and said lateral distance defining the width of said wood strip; and
- wood fibers creating the grain of the wood running substantially along said longitudinal length from said front surface to said rear surface;

said fourth wood strip having the same thickness as said first, second, and third wood strips;

said eighth wood strip having the same thickness as said fifth, sixth, and seventh wood strips;

said front surface of said third strip aligned with said second side surface of said fourth strip, said rear surface of said fourth strip abutting said first side surface of said third strip, said front surface of said fourth strip aligned with said second side surface of said first strip, said rear surface of said first strip abutting said first side surface of said fourth strip, and said lower surfaces of said first, second, third, and fourth strips substantially coplanar;

said front surface of said seventh strip abutting said first side surface of said eighth strip, said rear surface of said eighth strip aligned with said second side surface of said seventh strip, said front surface of said eighth strip abutting said first side surface of said fifth strip, said rear surface of said fifth strip aligned with said second side surface of said eighth strip, and said lower surfaces of said fifth, sixth, seventh, and eighth strips substantially coplanar;

said bonded together layers having:
- a third joint wherein end portions adjacent said rear surface of said eighth wood strip are in vertical relationship to end portions adjacent said front surface of said third wood strip;
- a fourth joint wherein end portions adjacent said rear surface of said fifth wood strip are in vertical relationship to end portions adjacent said front surface of said fourth wood strip; and,
- a fourth leg connecting said third and fourth joints.

9. The arrangement defined in claim 7 wherein said first and third legs are bent in planes perpendicular to said second leg.

10. The arrangement defined in claim 2 wherein said first leg is bent in a plane perpendicular to said second leg.

11. The arrangement defined in claim 1 wherein at least one of said first and second side surfaces has a color different from the color of said first and second side surfaces adjacent thereto.

* * * * *